Figure 1:
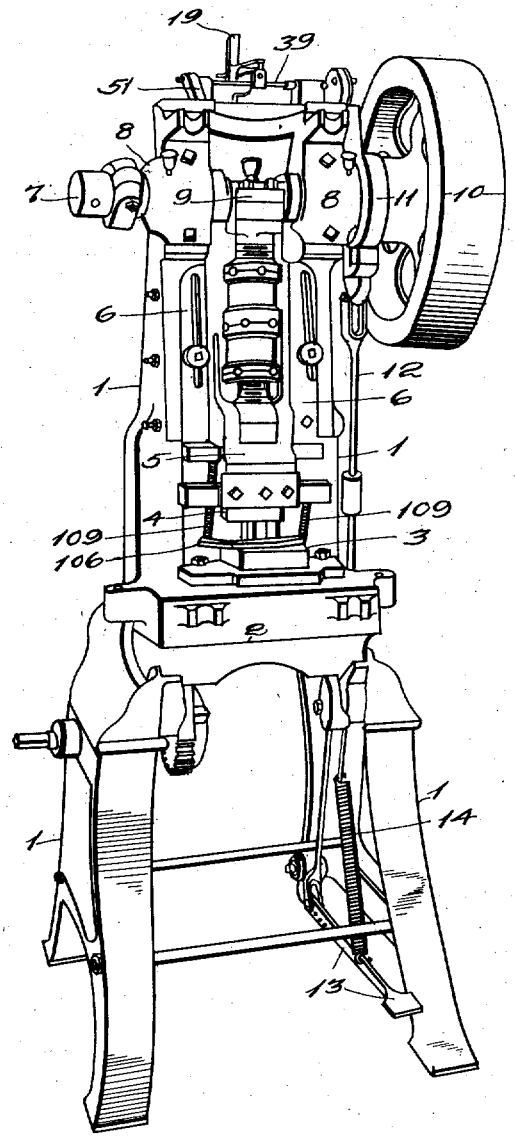

J. WRIGHT.

SAFETY GUARD FOR POWER PRESSES.

APPLICATION FILED JULY 31, 1915.

Reissued May 2, 1916.

14,125.

5 SHEETS—SHEET 1.

Inventor

James Wright

By Shepherd & Campbell

Attorneys

J. WRIGHT.

SAFETY GUARD FOR POWER PRESSES.

APPLICATION FILED JULY 31, 1915.

Reissued May 2, 1916.

14,125.

5 SHEETS—SHEET 2.

Inventor

James Wright

By Shepherd & Campbell

Attorneys.

J. WRIGHT.

SAFETY GUARD FOR POWER PRESSES.

APPLICATION FILED JULY 31, 1915.

Reissued May 2, 1916.

14,125.

5 SHEETS—SHEET 3.

Inventor

James Wright

By Shepherd & Campbell

Attorney

J. WRIGHT.

SAFETY GUARD FOR POWER PRESSES.

APPLICATION FILED JULY 31, 1915.

Reissued May 2, 1916.

14,125.

5 SHEETS—SHEET 4.

Inventor

James Wright

By Shepherd & Campbell

Attorney

J. WRIGHT.

SAFETY GUARD FOR POWER PRESSES.

APPLICATION FILED JULY 31, 1915.

Reissued May 2, 1916.

14,125.

5 SHEETS—SHEET 5.

Inventor

James Wright

By Shepherd & Campbell

Attorney

UNITED STATES PATENT OFFICE.

JAMES WRIGHT, OF HAMILTON, ONTARIO, CANADA, ASSIGNOR OF THREE-EIGHTHS TO WILLIAM SIMPSON STACEY, OF HAMILTON, ONTARIO, CANADA.

SAFETY-GUARD FOR POWER-PRESSES.

14,125. Specification of Reissued Letters Patent. Reissued May 2, 1916.

Original No. 1,067,632, dated July 15, 1913, Serial No. 710,640½. Reissue No. 13,647, dated November 11, 1913, Serial No. 794,355. This application for reissue filed July 31, 1915. Serial No. 43,034.

*To all whom it may concern:*

Be it known that I, JAMES WRIGHT, a citizen of the Dominion of Canada, residing at Hamilton, in the county of Wentworth, Province of Ontario, Canada, have invented certain new and useful Improvements in Safety-Guards for Power-Presses, of which the following is a specification.

This invention relates to safety guards for power presses and it has more particular reference to stamping press guards which are adapted to prevent injury to the fingers or hands of the operator.

It is well known that presses of the types referred to are usually fitted with a clutch—of any appropriate type—interposed between the source of power and the crank or eccentric or other mechanism actuating the reciprocating tool, and means such as a treadle or foot lever are provided for operating said clutch so as to cause the reciprocatory tool to perform its effective stroke, and vice versa to throw said tool out of action when desired. Various safety guards have been heretofore suggested for use in connection, or in conjunction with the mechanism for throwing the reciprocatory tool into operation to effectually prevent the said tool being connected to the source of power—upon the operation of the clutch treadle for throwing said tool into action—should the fingers or hands or any part thereof be in position to be crushed or injured by said tool, or in the event of any hand tool or other foreign body being accidentally placed or left in position to be crushed or touched by said safety guard or tool.

The main object of my invention is to provide a safety guard, which moves or always travels slightly in advance of, and with, the reciprocating tool, and thereby positively insures the operator being warned of approaching danger and if the hand of the operator is in the path thereof positively releases the press plunger from its driving mechanism and stops the same.

A further feature of my invention consists in arranging the movement of the protective element proper to synchronize with the operation of the press, in contradistinction to devices heretofore constructed which are all brought into the protective position by the movement of the foot lever or treadle prior to the release of the clutch.

Another very important feature of my invention consists in providing a safety guard for power presses which acts as a brake on the clutch and automatically and instantly stops the further movement of the reciprocatory tool in the event of any obstruction lying in the path of the protective element during its descent.

Another object of my invention is to provide a simple and effective means whereby for certain classes of work the operator is compelled to manipulate the stock in a plane below the upper face of the lower die.

With these and other objects in view, as will fully hereinafter appear, my invention consists in certain novel features of construction, combinations, and arrangements of parts hereinafter fully described, illustrated in the accompanying drawings forming a part of this specification, and more particularly pointed out in the appended claims.

Figure 2:
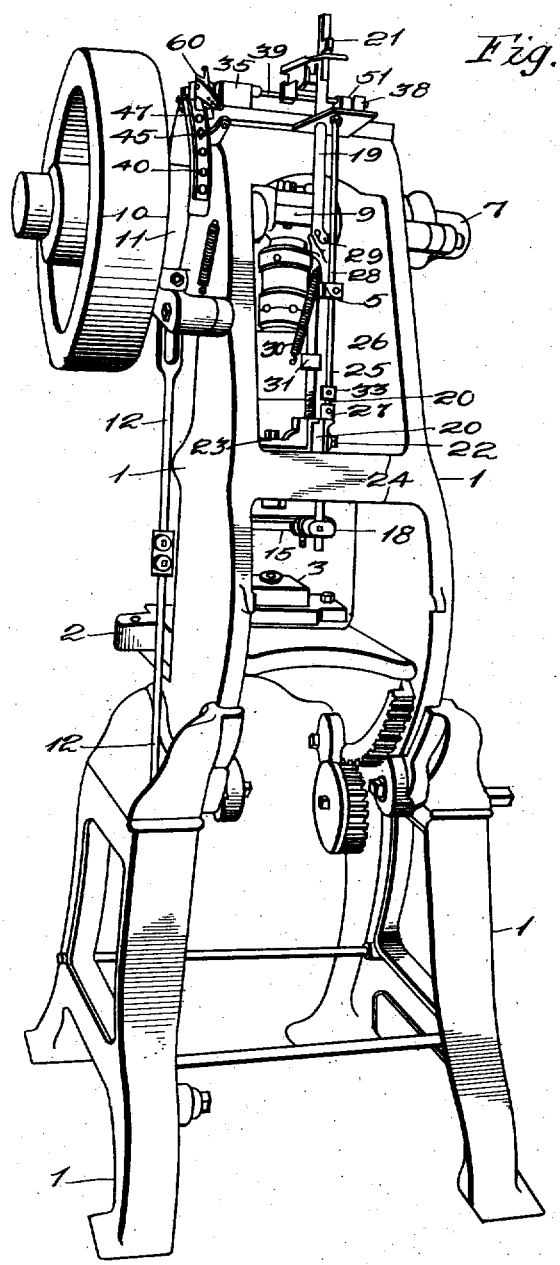
Figure 3:
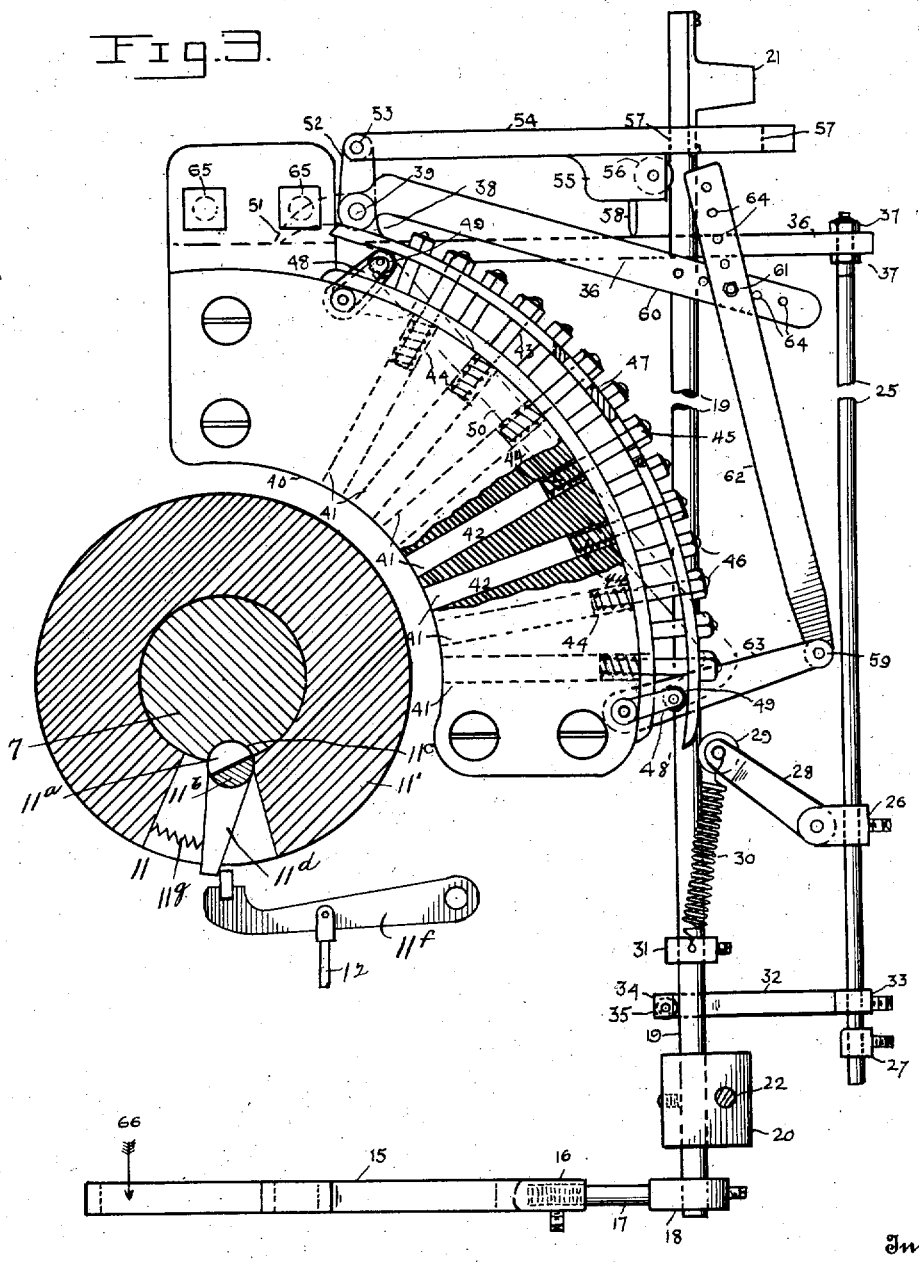
Figures 4, 5, 6:
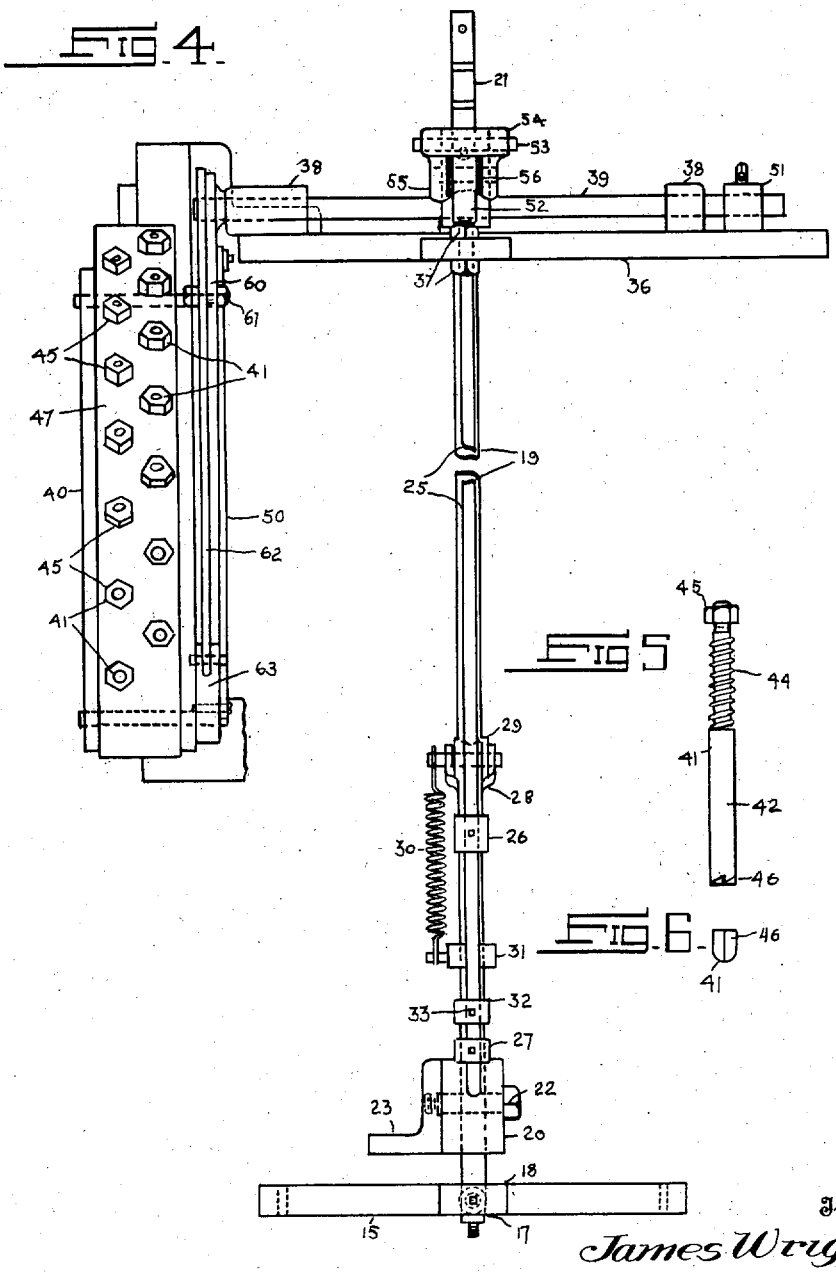
Figure 7:
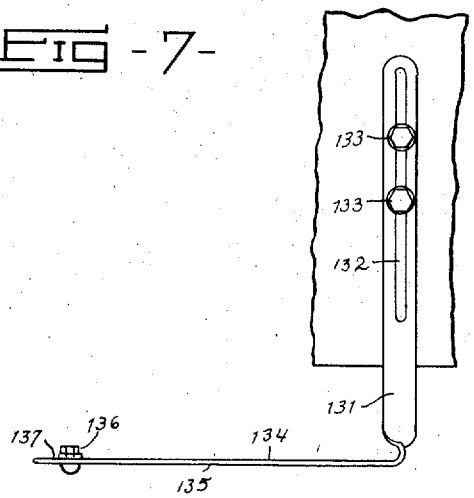
Figure 8:
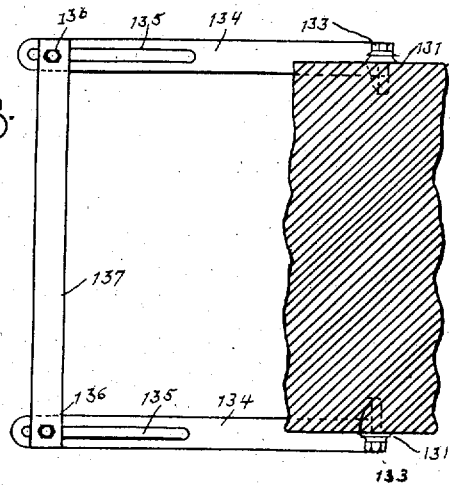

In the accompanying drawing:—Figure 1 is a front perspective view of a stamping press fitted with one form of my improved safety guard. Fig. 2 is a similar view of the same machine but taken from the rear thereof. Fig. 3 is an enlarged side elevation of the safety guard shown in connection with the press illustrated in Figs. 1 and 2, but with parts broken away or in section for the sake of clearness. Fig. 4 is a rear elevation of Fig. 3. Figs. 5 and 6 are respectively an elevation and underside plan of one of the spring controlled plungers or gripping teeth hereinafter more specifically referred to. Fig. 7 is a detail side elevation of a stationary and adjustable guide bar or frame which may be used in conjunction with my invention where the stock has to be held or handled by the operator, during the process of stamping or cutting, and Fig. 8 is a top plan view of the same.

Similar numerals of reference are employed to indicate corresponding parts throughout the several figures of the drawing.

Figs. 1 and 2 represent one form of stamping press having my invention applied thereto, and of which presses there are several kinds, all of which can have my device readily attached thereto, small modifications only being required in some cases to adapt said invention to the particular make of press. The stamping press for working on sheet or other metal shown in said figures consists essentially of a frame work or base comprising standards 1, 1; a table 2, on which the female die 3, is conveniently bolted; a male die or punch 4, carried by a vertically movable crosshead 5, which is guided in guides 6, 6, on the aforesaid standards 1, 1. 7, is a horizontal shaft journaled in bearings 8, 8, at the upper ends of the standards 1, 1, and it is provided with an eccentric or crank 9, connected with the crosshead, and a continuously-rotating driving wheel or pulley 10, which is mounted on one end of the shaft 7, and is coupled therewith or uncoupled therefrom by a clutch 11, all of which parts may be of any usual or suitable construction. The clutch 11 is of a well-known form and is fitted with the usual tripping device or dog $11^a$ comprising a semi-circular part $11^b$ adapted to be rocked out of a recess $11^c$ in the face of drive shaft 7 when a crank extension thereof indicated at $11^d$, and which extends outwardly through the collar 11′ of clutch 11 is engaged by a trip $11^f$ carried upon the upper end of a connecting rod 12 by means of which the said shaft is uncoupled from said wheel. When trip $11^f$ is depressed a spring $11^g$ moves dog $11^a$ to rock the part $11^b$ so that it couples the shaft 7 to wheel 10 and the crosshead 5 is thereby caused to descend and ascend. Said dog is controlled by means of connecting rod 12, which is coupled to the foot lever or treadle 13 which is under the action of a spiral or other suitable spring 14, in the known way. 15, is the protective element or guard proper arranged, mounted and operated according to my invention as follows: This guard proper, 15, may be of any suitable pattern or contour in plan to suit the male die of the press to which the device is to be attached, and it is preferably fashioned with a laterally and rearwardly projecting lug 16, to permit of its lateral adjustment on a rod 17, furnished with an eyepiece 18, for adjustable connection to the lower end of an oscillatory rod 19. This oscillatory rod 19, is carried by a block or pivotally mounted piece 20, and it is furnished at its upper part with a laterally or rearwardly projecting tooth 21, for the purpose hereafter to be explained. The pivotally mounted piece 20, is—as shown—preferably pivotally connected by a pin 22, to a bracket or bearing 23, conveniently secured on the press plunger. 24, is one of the cross ties connecting the standards 1, 1, together. Parallel with and rearward of the aforesaid rod 19, I arrange a depending and rigidly secured rod 25, which is adapted to serve as a guide or support for adjustable blocks or stops 26, 27, the former of which has hingedly connected thereto a lever 28, fitted at its free end with an antifriction roller 29, adapted to contact with and be traversed by the aforesaid oscillatory rod 19. In order to keep the roller 29, in operative engagement with the oscillatory rod 19, I fit a spring 30, one end whereof is connected to the aforesaid lever 28, and the other end is attached to an adjustable collar 31, on the oscillatory rod 19. 32, is a link or bar adjustably connected at 33, to the depending rod 25 and it is fitted at its forward end with a bent back portion 34, in which is revolubly mounted an anti-friction roller 35, which normally serves as a guide for the aforesaid oscillatory rod 19, but at the same time it is so positioned as to coöperate with the stop 31, for the purpose here explained. The rigid rod 25, is carried by a laterally and rearwardly projecting bracket 36, to which it is adjustably connected by lock-nuts 37, 37, at its upper end, and said bracket 36, is conveniently secured to or carried by the upper part of the aforesaid framework 1, 1. Transversely of the upper part of the framework 1, 1, I mount in brackets 38, 38, a shaft or spindle 39, which serves, when the aforesaid oscillatory rod 19, is rocked rearwardly on its supporting center 22, to release the clutch locking mechanism now to be described. This comprises a brake strap 40, in which are radially located a series of spring-controlled plungers or movable gripping devices 41, 41. Each of said gripping devices 41, 41 comprises a shank portion 42, (Figs. 5 and 6) of the cross-section shown by the underside plan in Fig. 6, and an extension 43, which is surrounded by a spiral spring 44, and said gripping devices are longitudinally adjustable by a lock nut or nuts 45. In the form of my invention shown these gripping devices are formed with butt ends, but in order to effectively insure more instantaneous and effective action their inner ends may be toothed as shown at 46, in Figs. 5 and 6, whereby—when released—they are rendered doubly effective to arrest a further movement of the dog controlling the operation of the clutch 11 above referred to. It will be readily understood that arresting said dog by the plungers will have exactly the same effect as arresting them by the trip of rod 12, that is, this arresting of the dog will release the clutch and disconnect the plunger from the driving wheel. The gripping or arresting devices 41, 41, are arranged for radial movement outward by means of a strap 47, which is adapted to be concentrically and radially moved by wiper arm 48, 48′, furnished with anti-friction rollers 49, 49, conveniently housed in correspondingly shaped recesses in the aforesaid brake strap 40. These wiper arms 48, 48′, are connected together by a cranked arm 50, so that when moved about their axes as hereafter explained, the entire series of radially disposed gripping devices 41, 41, are simultaneously raised or lowered into operative engagement with the clutch release. In order to attain this end the gripping devices are arranged to all contact with the strap or concentric piece 47, in such manner that when the wiper arms 48, 48′, are raised or lowered the members 41 are simultaneously and synchronously raised or lowered.

51, Figs. 3 and 4 is a detent or pawl for preventing back motion of the spindle 39, and medially of said spindle 39, I fix an arm or lever 52, which in turn is hingedly connected at 53, to a rocking bar 54, provided with a depending portion 55, in which is revolubly mounted an antifriction roller 56, arranged to normally contact with the front side of the oscillatory rod 19. This rocking bar 54 is slotted at its rear part 57 to provide a clearance for the tooth 21, aforesaid and for the purpose hereafter explained.

58, is a stop or pin on the underside of the depending portion 55, which rests normally on the laterally and rearwardly extending bracket 36, that supports the rigid rod 25, above described.

60, is a lever adjustably connected at 61 to a link 62 united hingedly at its lower end 59, to a lever 63, rigidly secured to the shaft or spindle of the lower wiper 48′. Thus it will be readily seen that when the levers 60 and 63 are raised or lowered the strap 47 will be moved radially outward or inward and thereby effect the operation of the members 41, as above stated. Obviously the levers and links 60, 62, respectively, may be otherwise connected so as to insure uniformity of action, and I wish it understood that I may fit one or both of said levers or link with hand grips in order to facilitate the returning of the several parts to their normal position. In order to make ready provision for accurately adjusting the brake to different sizes of presses, I provide both the lever and link 60, 62, respectively, with a series of holes 64, 64, through which the connecting pivotal pin 61 is passed as desired.

65, 65, are clamping studs or bolts by means of which the entire device is rigidly secured to the side of the press adjacent the clutch, and it is evident the holes through which the shanks 42, of the plungers 41, pass the strap 47 are elongated to give the requisite clearance.

Obviously the pivotally mounted block or piece 20 may be reversely located to the position shown and thereby render the device more sensitive; for example the parts may be so arranged that a thickness of stout paper interposed between the under face of the protective element 15 at the point 66, Fig. 3 and the upper face of the female die will be quite sufficient to cause the oscillatory rod 19 to be thrown sufficiently rearward for the projecting tooth 21 to contact either with the upper or lower rear end of the rock bar 54. Instantly such contact takes place, the transverse spindle 39 is turned about its axis and the lever and link 60, 62 respectively are tripped, which throws the wipers 48, 48′ past their supporting centers for the strap 47, whereupon the full force of the springs 44, 44 is brought into play and the entire set of plungers 42 are radially projected inward and jammed in the path of the clutch dog thus instantly arresting its further driving effect or force. The action of these plungers is more than a mere clutch releasing action for it is to be understood that the plungers exert a distinct braking and retarding effect upon the rotative element by which said dog is carried and by which motion is imparted to shaft 8 in a manner well known. This part of my invention will be clear to and fully understood by all those skilled in the art to which it appertains and it will be further seen that by staggering the plungers 42, as shown in Figs. 3 and 4, the device is rendered doubly sensitive. Furthermore, I may cross cut or notch the nose of the clutch dog itself to render it more efficient and easier engaged by one or more of the plungers 42. *Prima facie*, in very large presses the rows of plungers 42 may be multiplied in staggered relation and I wish to here point out that by actual experiments I find that no matter what the size or weight of the press plunger or reciprocating part may be the device is instantly effective when the slightest obstruction lies in the downward path of the protective element or guard 15. A further important point to be particularly noted in connection with my invention is the fact that the oscillatory rod 19 and guard 15 lie in planes at substantially right angles one to the other and that the distance from the point of suspension 22 of the protective portion of said guard 15 is many times less than that of the tooth 21 to said point of suspension. Or, in other words, a very slight movement or tilting of the guard 15 is considerably multiplied as regards the movement of the tooth 21. If no obstruction lies in the path of the guard 15, the oscillatory rod 19 is moved vertically up and down with the press plunger to the rear of which it is connected by the bracket 23, above referred to. Once the brake device is thrown into action the press plunger is effectively stopped and cannot be moved in either direction until the operator goes behind the press and raises the strap 47 by forcing up the lever 63 and its connected parts to the position shown most clearly in Fig. 3. Thus it will be clearly seen that no matter what the obstruction is in the path of the protective element 15 it must be removed before further work can be operated on.

106, Fig. 1, is a stripper of appropriate pattern under the influence of springs 109 carried by the press plunger or crosshead 5.

For certain classes of work it is essential that the operator handle the stock while being operated on, and in such cases I employ the device shown by Figs. 7 and 8, in combination with the guard above described. This device consists of angle pieces, the vertical sides 131 whereof are slotted at 132 and they are conveniently clamped to the sides of the press frame or the guides 6, 6, by set screws 133, 133, which permit of the device being vertically adjusted. The lateral links 134, 134, of the angle pieces are turned into a horizontal plane and slotted at 135, 135, to receive clamping bolts 136, 136, which hold in place a strip 137. This device is adjusted so that the horizontal links 134, 134 are on a plane with the top face of the female die 3, with the strip 137 sufficiently in front thereof for the operator to manipulate his stock by putting his fingers below said strip. If the operator forgets, and tries to handle his stock above the strip 137, the protective member 15 will be brought into operation and trip the clutch locking brake before any damage or injury can be brought about.

Obviously the angle pieces may be inverted and clamped to the table 2 of the press without departing from the spirit and scope of my invention.

This rigid attachment is particularly useful for cases where the operator is working on cup-shapes having holes punched in their sides when it is necessary for said operator to hold the cup shape in place. In such cases the strip 137 will be set so as to compel the operator to handle his work from under said strip 137 where his hands will be safe and free from any chance of injury. If he should forget and put his hand or fingers over the strip 137 he will be struck by the descending stripper 106 or guard 15 when the press will be instantly stopped as above set forth. The top edge of the strip 137 will never be arranged or adjusted below the face of the lower die thereby rendering it impossible to get the fingers over the guard and under the punch proper.

The operation of my improved safety guard is briefly as follows: As the punch 4 descends the guard 15 or stripper 106 will travel slightly in advance thereof. If there be no obstruction encountered said guard 15 or stripper 106 will be lifted when it contacts with the lower die 3. This movement will synchronize with the stop 31 contacting with the arm 32 whereupon the rod 19 will be allowed to tilt rearwardly in the slot 57 without engaging the rock bar 54 that releases the clutch brake 40. If, upon the other hand, the guard encounters an obstruction then the plungers 42 are projected inwardly into the path of the dog 11[a], the driving shaft is released from the driving wheel and in addition a distinct braking action is exerted by the plungers to thereby bring the press to a sudden stop in ample time to prevent injury to the hand of the operator.

From the foregoing description and accompanying drawing, it will be readily seen that by the invention I provide an extremely effective and reliable device for the purposes set forth, while at the same time in no way interfering with the utility or efficiency of the press, all that is necessary, being the tapping of three or four holes and insertion of set screws to attach the entire device in position.

It is particularly to be noted that the present invention differs from devices heretofore proposed for preventing injury to the hands of the operator in the following important way: In the present invention the punch actually starts upon its effective stroke, but if the hand of the operator is in the way the punch is stopped. In all devices heretofore employed the punch was prevented from starting until the guard had actually moved to protective position. At first glance it may seem immaterial whether a press is prevented from starting when an obstruction is presented, or whether it is permitted to start and then stopped, but a consideration of actual working conditions will show that this distinction is an important one. This is due to the fact that in many cases the operators of the presses work upon a piece-work basis, and they object to any attachment being put upon the press which will cut down the out-put of the press, and if such attachments are put on, they resort to every means to increase the out-put of the press even at the risk of danger to themselves. With this fact in mind, it will be readily apparent that it is highly desired to permit the press to start and be well on its way to complete its cycle of operation before the guard is brought to fully protective position, if efficient means are provided for stopping the press in good season if the hand of the operator is in the way, because that much time is saved in every stroke of the press; *i. e.*, the time that is occupied in the travel of the press from its starting to its emergency stopping position. It is, therefore, apparent that the output of a press equipped with this device will be materially greater than would be the case with a press equipped with, say for instance, one of the well known types of guards actuated by the treadle of the press, and in which the guard has to be brought all the way down to protective position before the press can start upon its cycle of operation. In the same length of time the press herein shown and described would be well started upon its cycle of operation. A further and very important feature is that the danger of the guard dropping or being pressed down with undue force and injuring the hand of the operator or possibly holding the operator so as to be injured by the main working member is avoided, it being possible in some of the known devices to spring the operating members so as to start the punch into operation even though an obstruction be under the guard in which case the guard would act as a device to hold the operator from withdrawal.

Obviously my invention may be readily adapted to any type of stamping press or machine having a reciprocatory tool worked or operated by a clutch release mechanism, as all parts are made relatively adjustable and I wish it clearly understood that I do not confine myself to the specific arrangements and combinations of parts illustrated and described, various alterations in their form and the arrangement thereof being possible without in any way departing from the spirit and scope of the invention, and it is intended fully to include all such within the present application and as limited by the appended claims.

Having thus described my invention, what I claim as new and desire to secure by Letters Patent, is:—

1. In a safety guard for stamping presses, the combination with a driving member of the press, of a brake element, a guard element, and means for causing said brake element to engage said driving member of the press when said guard element encounters an obstruction.

2. In a safety guard for stamping presses, the combination with a driving member of the press, of a toothed brake member, a guard element, and means for causing said toothed brake member to engage said driving member of the press when said guard element encounters an obstruction.

3. In a safety guard for stamping presses, the combination with a driving member of the press, of a brake element, a guard element, means for causing said brake element to engage said driving member of the press when said guard element encounters an obstruction, said brake member comprising a plurality of radially disposed members, and a connecting strap for all of said radially disposed members, whereby all of said radially disposed members are moved simultaneously to and from operative position.

4. In a safety guard for stamping presses, the combination with a driving member of the press, of a brake element, a guard element, means for causing said brake element to engage said driving member of the press when said guard element encounters an obstruction, said brake element comprising a plurality of radially disposed spring actuated plungers, and a strap through which all of said plungers pass.

5. In a safety guard for stamping presses, the combination with a driving member of the press, of a brake element, a guard element, means for causing said brake element to engage said driving member of the press when said guard element encounters an obstruction, said brake element comprising a plurality of radially disposed spring actuated plungers, and a strap through which all of said plungers loosely pass.

6. In a safety guard for stamping presses, the combination with a driving member of the press, of a brake element, a guard element, means for causing said brake element to engage said driving member of the press when said guard element encounters an obstruction, said brake element comprising an arcuate member, a plurality of radially disposed plungers passing through said arcuate member, springs for forcing said plungers inwardly, and a strap through which all of said plungers pass.

7. In a safety guard for stamping presses, the combination with a movable press member, of a braking mechanism, a press driving element upon which said braking mechanism acts, a controlling member for said braking mechanism, and a guard carrying element movable bodily with the movable press member and pivotally mounted upon said press member and engaging and actuating said controlling member when tilted out of normal alinement.

8. In a safety guard for stamping presses, the combination with a movable press member, of a restraining mechanism, a press driving element upon which said restraining mechanism acts, a controlling member for said restraining mechanism, and a guard carrying element movable bodily with the movable press member and engaging and actuating said controlling member when tilted out of normal alinement by the contact of the guard with an obstruction.

9. In a safety guard for stamping presses, the combination with a movable press member, of a braking mechanism, a press driving element upon which said braking mechanism acts, a controlling member for said braking mechanism, and a guard carrying element movable bodily with the movable press member and pivotally mounted upon said press member and engaging and actuating said controlling member when tilted out of normal alinement by the contact of the guard with an obstruction, said braking mechanism comprising a plurality of radially disposed members.

10. In a safety guard for stamping presses, the combination with a movable press member, of a braking mechanism, a press driving element upon which said braking mechanism acts, a controlling member for said braking mechanism, a guard carrying element movable bodily with the movable press member and pivotally mounted upon said press member and engaging and actuating said controlling member when tilted out of normal alinement by the contact of the guard with an obstruction, said braking mechanism comprising a plurality of radially disposed spring pressed member.

11. In a safety guard for stamping presses, the combination with a movable press member, of a braking mechanism, a press driving element upon which said braking mechanism acts, a controlling member for said braking mechanism, and a guard carrying element movable bodily with the movable press member and pivotally mounted upon said press member and engaging and actuating said controlling member when tilted out of normal alinment by the contact of the guard with an obstruction, said braking mechanism comprising a plurality of radially disposed toothed plungers.

12. In a safety guard for stamping presses, the combination with a movable press member, of a braking mechanism, a press driving element upon which said braking mechanism acts, a controlling member for said braking mechanism, a guard carrying element movable bodily with the movable press member and pivotally mounted upon said press member and engaging and actuating said controlling member when tilted out of normal alinement by the contact of the guard with an obstruction, said braking mechanism comprising a plurality of radially disposed spring pressed members, and a common actuating member for all of said plungers.

13. In a safety guard for stamping presses, the combination with a movable press member, of a braking mechanism, a controlling member for said braking mechanism, a press driving element upon which said braking mechanism acts, a guard carrying element movable bodily with the movable press member and pivotally mounted upon said press member and engaging and actuating said controlling member when tilted out of normal alinement by the contact of the guard with an obstruction, said braking mechanism comprising a plurality of radially disposed toothed plungers, and a common actuating member for all of said plungers.

14. In a safety guard for stamping presses, a restraining brake comprising an arcuate member, a plurality of radially disposed brake elements, means for actuating said elements in one direction, a press actuated member for actuating said elements in the opposite direction and against the tension of said means.

15. In a safety guard for stamping presses, a restraining brake mechanism comprising an arcuate member, a plurality of radially disposed spring pressed plungers mounted therein, a common actuating strap for all of said plungers, cranks arranged adjacent each end of said strap and arranged when actuated to move said strap against the tension of said springs, and a member for actuating said cranks simultaneously.

16. In a safety guard for stamping presses, a restraining brake mechanism comprising an arcuate member, a plurality of radially disposed spring pressed plungers mounted therein, a common actuating strap for all of said plungers, cranks arranged adjacent each end of said strap and arranged when actuated to move said strap against the tension of said springs, a member for actuating said cranks simultaneously, a guard carrying element bodily movable with and pivoted upon the press plunger, and means for actuating said cranks when said guard carrying element is swung out of normal alinement by contact with an obstruction.

17. In a device of the character described, the combination with a vertically movable press plunger, of a rod pivotally mounted thereon and bodily movable therewith, a guard element carried by said rod, a restraining brake, an actuating member for said brake through which said rod travels, the tilting of said rod upon its pivotal point when the guard strikes an obstruction serving to move said brake actuating member.

18. In a device of the character described, the combination with a press and its vertically movable tool carrying member, of a guard carrying rod pivotally mounted upon said plunger and bodily movable therewith, a guard carried by said guard carrying rod, a restraining brake mechanism, an operating member for said brake mechanism, said guard carrying rod traveling in a cut out portion of said operating member, and a projection carried by said rod and adapted to engage and actuate said brake controlling member when the guard carrying rod is tilted upon its pivot.

19. In a device of the character described, the combination with a restraining brake, of a controlling member therefor, a guard carrying rod passing through said controlling member and movable in a cut out portion thereof, a block pivotally mounted upon the press plunger and through which said guard carrying member passes, and a guard carried by said guard carrying member.

20. In a device of the character described, the combination with a restraining brake, of a controlling member therefor, a guard carrying rod passing through said controlling member and movable in a cut out portion thereof, a block pivotally mounted upon the press plunger and through which said guard carrying member passes, and a guard carried by said guard carrying member, said guard lying substantially at right angles to the guard carrying member.

21. In a device of the character described, the combination with a restraining brake, of a guard carrying rod pivotally mounted upon the press plunger and bodily movable therewith, a guard carried by said guard carrying rod, a controlling member for the brake mechanism, an anti-friction roller carried by said controlling member and bearing against the guard carrying rod, a fixed member, a lever pivotally mounted thereon, anti-friction roller carried by said lever bearing upon the guard carrying rod, and a spring connection between said lever and said guard carrying rod.

22. In a device of the character described, the combination with a restraining brake mechanism of a shaft mounted upon a fixed portion of the press frame, a horizontally disposed controlling member, an arm carried by said shaft to which one end of said controlling member is pivoted, and means actuated by said shaft for controlling the brake mechanism.

23. In a device of the character described, the combination with a restraining brake mechanism, of a shaft mounted upon a fixed portion of the press frame, a horizontally disposed controlling member, an arm carried by said shaft to which one end of said controlling member is pivoted, means actuated by said shaft for controlling the brake mechanism, a guard carrying rod, a guard carried by said rod, and means carried by said rod for actuating said controlling member when said rod is tilted out of vertical alinement.

24. In a device of the character described, the combination with a restraining mechanism, of a shaft mounted upon a fixed portion of the press frame, a horizontally disposed controlling member, an arm carried by said shaft to which one end of said controlling member is pivoted, means actuated by said shaft for controlling the brake mechanism, a guard carrying rod, a guard carried by said rod, and means carried by said rod for actuating said controlling member when said rod is tilted out of vertical alinement, said rod being pivotally mounted upon and traveling with the press plunger.

25. In a device of the character described, the combination with a stamping press, of a vertically movable guard, and a fixed member arranged in such position that the stock must be handled therebeneath and so keep the fingers of the operator out of the path of said guard.

26. The combination with a work performing element, and driving means therefor, of means operable when an obstruction is encountered for disconnecting the work performing element from said driving means after said work performing element has partly completed its cycle of operation.

27. In a safety device for power presses the combination with a press having a movable work performing element and a driving means for said work performing element, of a guard and means controlled by said guard actuated on the guard striking an obstruction for disconnecting said work performing element from its driving means after it has partly completed its cycle of operation.

28. In a device of the character described the combination with a work performing element and a bed toward which it moves, and a driving means for said work performing element, of a guard moving in unison with said work performing element, and means operable when said guard strikes an obstruction for disconnecting the work performing element from its driving means after said work performing element has partly completed its cycle of operation.

29. In a device of the character described the combination with a reciprocatory punch, and a bed toward which it moves, and a driving means for said punch of a mechanically actuated guard moving alternately toward and from said bed, and means controlled by said guard and operable when said guard strikes an obstruction for disconnecting said punch from its driving means after said punch has partly completed its effective stroke.

30. A power press comprising a punch, and a driving means for said punch, of a manually operable trip, a clutch controlled thereby for connecting the driving means to the punch, an auxiliary trip for controlling said clutch, and a guard actuated from a moving part of the press mechanism and moving to and from protective position in front of the punch and controlling said auxiliary trip to cause the latter to actuate the clutch to release the punch from its driving mechanism when said guard strikes an obstruction.

31. In a device of the character described the combination with a press having a movable plunger, of a press controlling element the movement of which stops said plunger, a guard which moves in synchronism with the plunger, and connections between said guard and the press controlling element so arranged that the encountering of an obstruction by said guard will result in actuating said press controlling element.

32. In a safety guard, the combination with the work performing element and a continuously moving power driving means therefor, of a guard adapted on encountering an obstruction to disconnect the work performing element from the driving means, said guard being coöperatively related to the work performing element and moving in such proximity thereto as to contact with the hands of the operator when the operator's hands are in position to be injured during the movement of the work performing element.

33. In a safety guard, the combination with the work performing element and a continuously moving power means for driving the same, of a guard adapted on encountering an obstruction to interrupt the cycle of operation of the work performing element, said guard being coöperatively related to the work performing element and moving in such proximity thereto as to contact with the hands of the operator when the operator's hands are in position to be injured during the movement of the work performing element.

34. In a safety guard, the combination with the work performing element and power means for driving the same, of means moving coincident with the work performing element and in advance thereof adapted on encountering an obstruction to disconnect the work performing element from said driving means and thereby interrupt the cycle of operation of the work performing element.

35. In a device of the character described, the combination with the press plunger, of a tiltable element mounted upon said plunger and traveling therewith, a guard element carried by said tiltable element, a brake mechanism, and means controllable by the tilting of said tiltable element from normal position for throwing said brake mechanism into action to arrest the movement of said plunger.

36. In a device of the character described, the combination with a punch or plunger of a press, of a guard bodily movable therewith and capable of movement with relation to the punch or plunger, a press controlling element and connections between said press controlling element and the guard arranged to impart movement to the press controlling element to stop the press when movement is imparted to the guard with relation to the plunger by reason of the presence of an obstruction.

37. In a device of the character described, the combination with a press having a movable plunger of a press controlling element the movement of which stops said plunger, a guard which moves in synchronism with the plunger and connections between said guard and the press controlling element so arranged that the encountering of an obstruction by said guard will result in actuating said press controlling element.

JAMES WRIGHT.

Copies of this patent may be obtained for five cents each, by addressing the "Commissioner of Patents, Washington, D. C."